(12) United States Patent
Brightman et al.

(10) Patent No.: US 6,442,635 B1
(45) Date of Patent: *Aug. 27, 2002

(54) PROCESSOR ARCHITECTURE FOR VIRTUALIZING SELECTIVE EXTERNAL BUS TRANSACTIONS

(75) Inventors: Thomas B. Brightman, Dallas, TX (US); Frederick S. Dunlap; Andrew D. Funk, both of Longmont, CO (US)

(73) Assignee: VIA-Cyrix, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/193,083

(22) Filed: Nov. 16, 1998

Related U.S. Application Data

(63) Continuation of application No. 08/540,351, filed on Oct. 6, 1995, now Pat. No. 5,838,987.

(51) Int. Cl.[7] .............................................. G06F 13/14
(52) U.S. Cl. ...................... 710/268; 710/40; 710/260; 711/147; 711/150
(58) Field of Search ........................ 710/40, 268, 260; 711/147, 150

(56) References Cited

U.S. PATENT DOCUMENTS

| | | | | |
|---|---|---|---|---|
| 4,514,805 A | * | 4/1985 | McDonough et al. | 710/261 |
| 4,812,975 A | * | 3/1989 | Adachi et al. | 395/500 |
| 4,885,681 A | * | 12/1989 | Umeno et al. | 709/1 |
| 5,155,838 A | * | 10/1992 | Kishi | 395/500 |
| 5,175,853 A | * | 12/1992 | Kardach et al. | 395/650 |
| 5,560,002 A | * | 9/1996 | Kardach et al. | 713/500 |
| 5,590,312 A | * | 12/1996 | Marisetty | 395/500.44 |
| 5,845,133 A | * | 12/1998 | Funk | 710/268 |
| 6,212,592 B1 | * | 4/2001 | Klein | 710/260 |

* cited by examiner

*Primary Examiner*—Jeffrey Gaffin
*Assistant Examiner*—Abdelmoniem Elamin
(74) *Attorney, Agent, or Firm*—Carr & Ferrell LLP

(57) ABSTRACT

A processing system having a virtual subsystem architecture employs a reentrant system management mode mechanism and device handlers along with remappable hardware resources to simulate physical subsystems, all transparent to application programs executing on the processing system.

14 Claims, 3 Drawing Sheets

PROCESSOR ARCHITECTURE FOR VIRTUALIZING SELECTIVE EXTERNAL BUS TRANSACTIONS

CROSS-REFERENCES TO RELATED APPLICATIONS:

This Application is a continuation of U.S. patent application Ser. No. 08/540,351, filed Oct. 6, 1995, now U.S. Pat. No. 5,838,987; which is related to commonly assigned U.S. patent application No. 08/458,326, filed Jun. 2, 1995, and U.S. patent application No. 08/498,965, filed Jul. 6, 1995 now U.S. Pat. No. 5,845,133, and this Application is related to commonly assigned U.S. patent applications Ser. No. 08/458,326, now abandoned, entitled "Virtualized Audio Generation And Capture In A Computer", filed Jun. 2, 1995, and Ser. No. 08/498,965 entitled "Virtualized Functions Within A Microprocessor", filed Jul. 6, 1995 now U.S. Pat. No. 5,845,133, the disclosures of both herein incorporated by reference.

BACKGROUND OF THE INVENTION

1. Field of the Invention:

The invention relates generally to computer systems, and more particularly to a virtual subsystem architecture that simulates isochronous or "real-time run" peripheral subsystems transparently to existing software programs.

2. Description of Related Art:

Computer systems generally include provisions for attachment of peripheral subsystems, typically through the use of an add-on card. These subsystems are identified or "mapped" through memory and I/O address space recognized by the central processing unit (CPU). In the PC environment, defacto protocols have arisen from the somewhat arbitrary memory and I/O mapping made popular through commercially successful products, such as, but not limited to, sound cards, modems, and graphics display adapters. Application software exists which implicitly embeds these defacto protocols—making hardware upgrades which deviate from backward compatibility undesirable.

Imposing backward compatibility on peripheral enhancements usually limits performance, increases costs, and requires additional space, typically in the form of additional integrated circuits or die space. The alternative to maintaining backward compatibility is highly unattractive or commercially unacceptable in that a plethora of legacy software must be abandoned.

By way of further background, CPU pipelining techniques are known for mitigating the latency associated with executing complex instructions. More specifically, instruction execution is broken down into multiple "phases" so that more than one instruction in a series of instructions, are executed at any one given time, albeit in different phases.

A related, but not entirely relevant technique to the present invention is the SuperState™ mode of operation described in the *Product Briefs for the CHIPSystem™ Architecture,* dated Oct. 1991, by Chips and Technologies, Inc., of San Jose, Calif. In this so-called "SuperState™ mode", software and hardware incompatibilities are reconciled by intercepting or "trapping" incompatible software commands or interrupts at the external bus level and translating them into a compatible format. This "SuperStatem™ mode", which is directed to "demand service" peripherals, is completely devoid of any teachings or suggestions of eliminating isochronous "real-time run" peripherals having critical timing constraints, such as, but not limited to, sound cards and modems. Moreover, the "SuperState™ mode" is completely devoid of any teachings or suggestions of handling memory mapped I/O in a virtual environment, handling virtual subsystems with a heavily pipelined CPU core, or using hardware resources, such as, but not limited to, counters, timers, comparators, and CODECS, to assist the virtual subsystems and which are remappable among the virtual subsystems to avoid duplication.

From the foregoing, it can be seen that there is a need for a virtual subsystem architecture that handles memory mapped I/O in a virtual environment, handles virtual subsystems with a heavily pipelined CPU core, and provides remappable virtual hardware resources, for virtualizing isochronous real-time run peripheral subsystems.

SUMMARY OF THE INVENTION

To overcome the limitations of the prior art described above, and to overcome other limitations that will become apparent upon reading and understanding the present specification, the present invention discloses a virtual subsystem architecture employing a native central processing unit along with a reentrant system management mode mechanism with multiple threads of execution, for trapping and servicing events which are intended to provoke a response from a physical subsystem in near real-time. External and internal trap mechanisms generate a System Management Interrupt (SMI) responsive to the occurrence of predetermined external and internal events, respectively. Responsive to the SMI, the native central processing unit determines the event that caused the interrupt and executes a series of instructions to simulate a response expected from the physical subsystem.

A feature of the present invention is the ability to virtualize subsystems with a heavily pipelined CPU core.

Another feature of the present invention is the ability to virtualize memory mapped physical subsystems.

Another feature of the present invention is the ability to virtualize multiple real-time run peripherals through the use of a reentrant system management mode mechanism.

Another feature of the present invention is remappable virtual hardware resources.

Another feature of the present invention is a high degree of integration and amortization of native central processing unit bandwidth to run both application software and to virtualize physical subsystems.

Another feature of the present invention is direct efficiency dependency of the virtualized subsystems on the speed of the native central processing unit.

Another feature of the present invention is that virtualized subsystems are independent of the operating system.

Another feature of the present invention is that virtualized subsystems do not require any special memory management handlers.

Another feature of the present invention is the ease of upgrading new programming for virtualized subsystems.

Another feature of the present invention is a reduction in the manufacturing cost of the computer system.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a virtual subsystem architecture, practiced in accordance with the principles of the present invention.

DESCRIPTION OF THE PREFERRED EMBODIMENT

Figure 1:
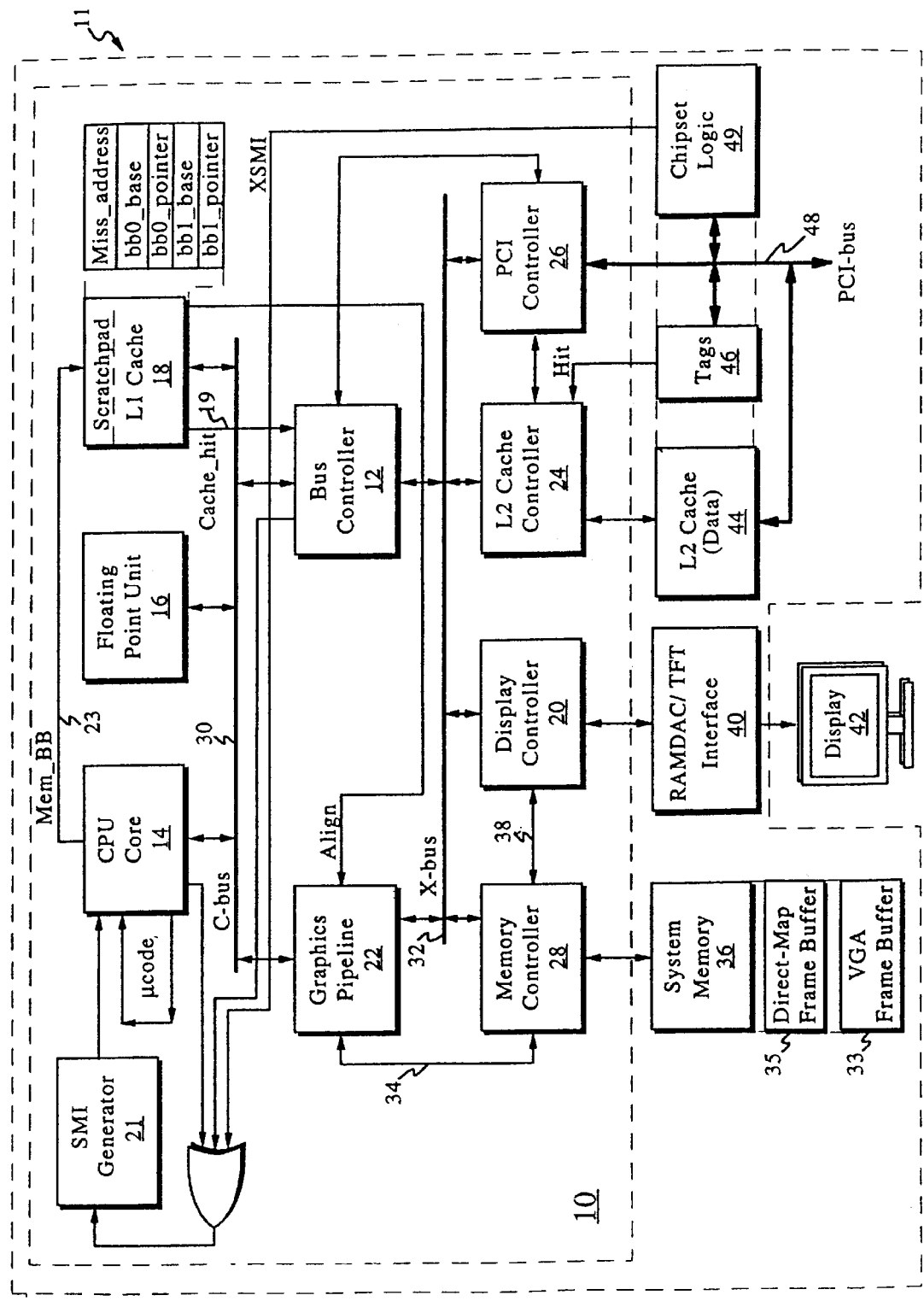
FIG. 1 is a general block diagram of a system employing a virtual subsystem architecture, practiced in accordance with the principles of the present invention.

The detailed description of the preferred embodiment for the present invention is organized as follows:
1. Exemplary System Employing A Virtual Subsystem Architecture
2. Exemplary Reentrant System Management Mode Mechanism
3. Event Trapping In A Pipelined Core
4. Multiple Threaded Virtual Subsystems
5. Remappable Hardware Resources
6. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 computer architecture, it has general applicability to any architecture. Certain terminology related to the x86 computer architecture (such as register names, signal nomenclature, etc.) which are known to practitioners in the field of microprocessor design, are not discussed in detail in order not to obscure the disclosure.

Moreover, structural details which will be readily apparent to those skilled in the art having the benefit of the description herein have been illustrated in the drawings by readily understandable block, state, and flow diagrams, showing and describing details that are pertinent to the present invention. Thus, the illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Throughout the specification, it is to be understood that the term "handler" is used to describe a convenient functional program module that is executed by the central processing unit. It is also to be understood that a condition, event, or method of implementation of a function being "transparent to an application program" describes that the application program neither knows nor needs to know of the condition, event, or method of implementation of a function to execute properly. It should also be understood that the term "control registers" is used throughout the specification to describe a mechanism for holding programmable values to select control, program, and data flow. Those skilled in the art, with the aid of the present disclosure, will recognize many forms and locations for control registers without departing from the scope of the present invention. The term "virtualize" is intended to mean simulation of properties expected of a device or subsystem responsive to an application program, without the actual presence of the device or subsystem, transparent to the application program. The terms "isochronous" or "real-time run" are intended to describe devices or subsystems having a temporal criticality associated with them for proper operation.

1. Exemplary Computer System Employing a Virtualized Display Subsystem

Reference is now made to FIG. 1 which depicts an exemplary, but not exclusive system employing a virtual subsystem architecture, practiced in accordance with the principles of the present invention. . A system circuit board 11 (a.k.a. motherboard) preferably includes buses to couple together a CPU 10, system memory 36, a RAMDAC/thin film transistor display panel interface 40, L2 cache 44, and chipset logic circuitry 49. A multi-tasking operating system program such as Microsoft® Windows™ preferably executes on the CPU 10 to manage primary operations.

The CPU 10 preferably includes the following functional units: an internal bus controller 12, a CPU core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a PCI-bus controller 26.

The bus controller 12, the CPU core 14, the FPU 16, the L1 cache 18, and the graphics pipeline 22, are coupled together through an internal (with respect to the CPU 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the CPU 10) X-bus 32. The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and Li cache 18 can operate substantially autonomously from the remainder of the CPU 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the CPU core 14 is performing an unrelated operation.

The CPU core 14 in the preferred embodiment is a six stage pipeline. The exact details of the CPU core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other numbers of stages for the pipeline and other configurations for the CPU core 14 without departing from the scope of the present invention.

The L1 cache 18 is preferably, although not exclusively, a 16 K byte unified data/instruction cache that operates in either a write-through or write-back mode. An area of the L1 cache 18 can be programmably partitioned as the scratchpad memory through configuration control registers (not shown) in the CPU core 14. Scratchpad control circuitry in the L1 cache 18 includes data pointers which can be used by either the CPU core 14 or the graphics pipeline 22 to access data in the scratchpad memory. The scratchpad memory may also be addressed directly by the CPU core 14.

An exemplary, but not exclusive, use for the scratchpad memory is as a m blit buffer for use by the graphics pipeline 22. More specifically, whenever data is moved on the display 42, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35. Programs executed by the CPU core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending U.S. patent application Ser. No. 08/464,921, filed Jun. 05, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate from the L1 cache 18 without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the CPU core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBlt operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/Thin Film Transistor (TFT) interface 40 which in turn drives a display 42.

The L2 cache controller 24 and PCI controller 26 collectively provide, inter alia, a high speed interface for an "off-chip" L2 cache 44 (with respect to the CPU 10). The preferred, although not exclusive, L2 cache interface is described in copending U.S. patent application Ser. No. 08/522,219, filed Aug. 31, 1995, entitled "L2 Cache Interface", assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the CPU 10, without departing from the scope of the present invention.

In the preferred embodiment, the exemplary SMI generator 21 receives a first input from the CPU core 14, a second input from the internal bus controller 12, and a third input (XSMI) from a source external to the CPU 10, preferably in the chipset logic circuitry 49. Chipset logic circuitry 49 is coupled to the PCI-bus 46 and preferably has interface logic including, but not limited to, FIFO buffers for receiving incoming and outgoing data and indicators to indicate fullness of a given buffer. The chipset logic circuitry 49 preferably also includes comparators, timers, and other trap-like circuitry to detect and indicate the occurrence of predetermined events outside the CPU 10. Those skilled in the art will recognize other forms for the SMI generator 21 and other inputs to the SMI generator 21 without departing from the scope or spirit of the present invention.

2. Exemplary Reentrant System Management Mode Mechanism

The preferred embodiment of the present invention supports a reentrant system management mode (SMM) mechanism which is a supervisory operating mode with multiple threads of execution, entered in response to a high priority system management interrupt (SMI). The SMI generator 21 generates an SMI responsive to the occurrence of several events, described in more detail hereinbelow. Those skilled in the art will recognize many forms of reentrant SMM without departing from the scope of the present invention. For purposes of the present invention, it is sufficient to understand that the reentrant SMM mechanism permits programs under the virtual subsystem architecture time-division-multiple-access (TDMA) and/or demand driven access to the CPU core 14 for execution on a hierarchical basis.

3. Event Trapping in a Pipelined Core

Figure 2:
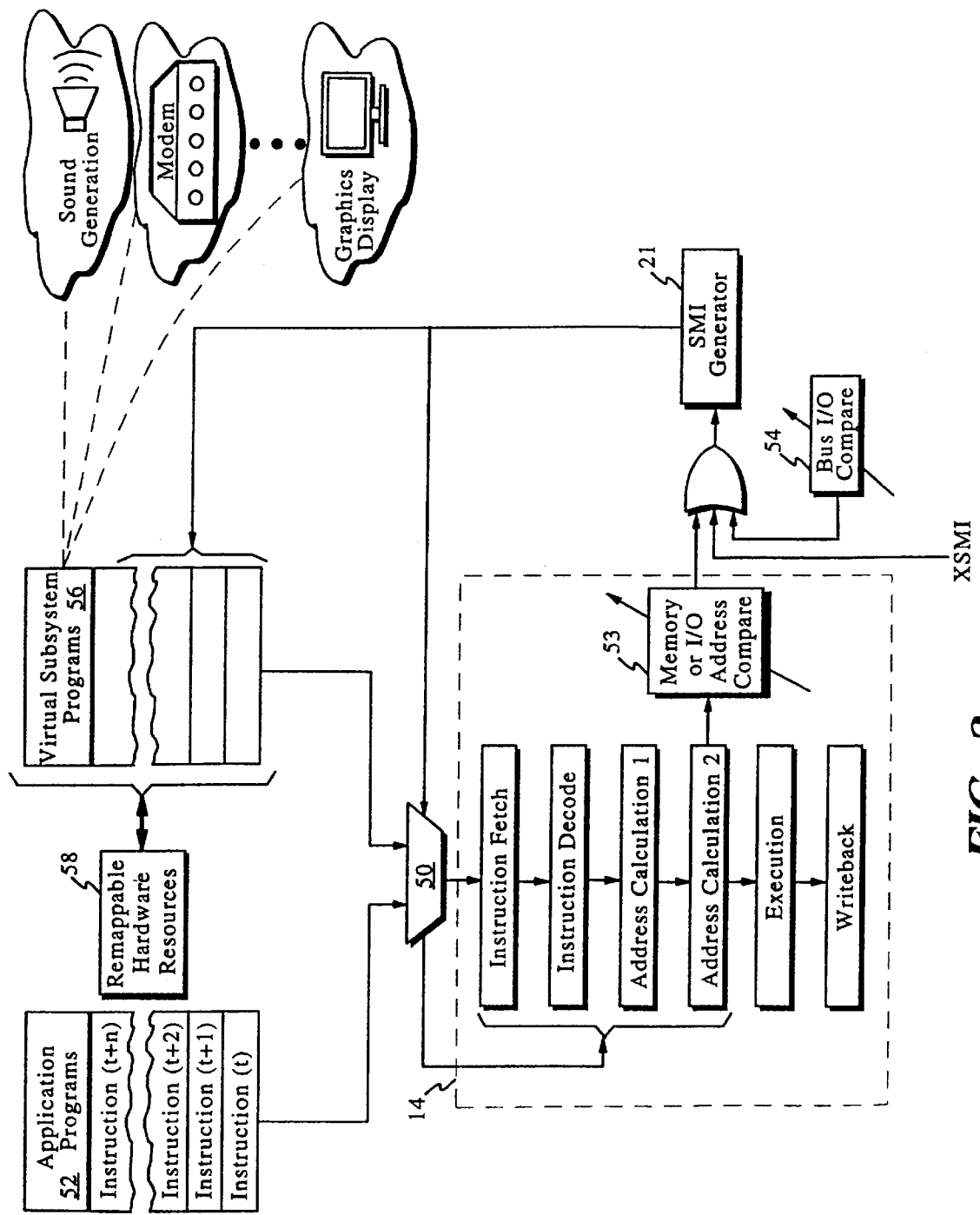
FIG. 2 is a more detailed block diagram of the virtual subsystem architecture.

Reference is now made to FIG. 2 which depicts a more detailed block diagram of the datapath for the virtual subsystem architecture, input conditions for triggering the reentrant SMM mechanism, and the pipelined CPU core 14, in accordance with the principles of the present invention. A multiplexer 50 ordinarily routes instructions from the application programs 52 through CPU core 14 for execution. As described above, the preferred embodiment for CPU core 14 is a six stage pipeline. Physical address calculations performed during the address translation (fourth) stage are compared with programmable address ranges for memory mapped and I/O mapped peripherals by compare circuitry 53. The address ranges for compare circuitry 53 are programmable through control registers (not shown) preferably located in the CPU core 14.

Assuming Instruction (t) references an address that matches an address in a range programmed in compare circuitry 53, an SMI is generated by SMI generator 21 which, among other things, flushes instructions on the pipeline starting with Instruction (t+1) which then resides in the address calculation 2 stage and continuing on back through the instruction fetch stage. Instruction (t) which then resides in the execution stage and Instructions (t−1) et seq. which reside in the Writeback stage, continue on through to the C-bus. Instruction (t) is preferably quashed by bus controller 12.

The output of compare circuitry 53 in the CPU core 14 is one input to the SMI generator 21. A second input to the SMI generator circuitry 21 is coupled to an external SMI input (XSMI), which for example, as described above, may be asserted by the chipset logic circuitry 49 to indicate that an input buffer is full. A third input to the SMI generator circuitry 21 is coupled to optional Bus I/O compare circuitry 54 (located in the internal bus controller 12) which can detect I/O accesses at the C-bus 30 level. The address ranges for Bus I/O compare circuitry 54 are also programmable through control registers (not shown) preferably located in the internal bus controller 12.

Upon the assertion of one of the three inputs to SMI generator 21, the SMI generator 21 invokes a handler to: i) determine the source of the SMI; ii) point to the appropriate entry address in the virtual subsystem programs 56; iii) flush the application program instructions in pipe stages one through five of the CPU core 14; and iv) switch multiplexer 50 to route the selected virtual subsystem program into the CPU core 14 for execution. Accordingly, the handler provides a software decode mechanism, allowing additional virtual systems to be easily added.

4. Multiple Threaded Virtual Subsystems

Figure 3:
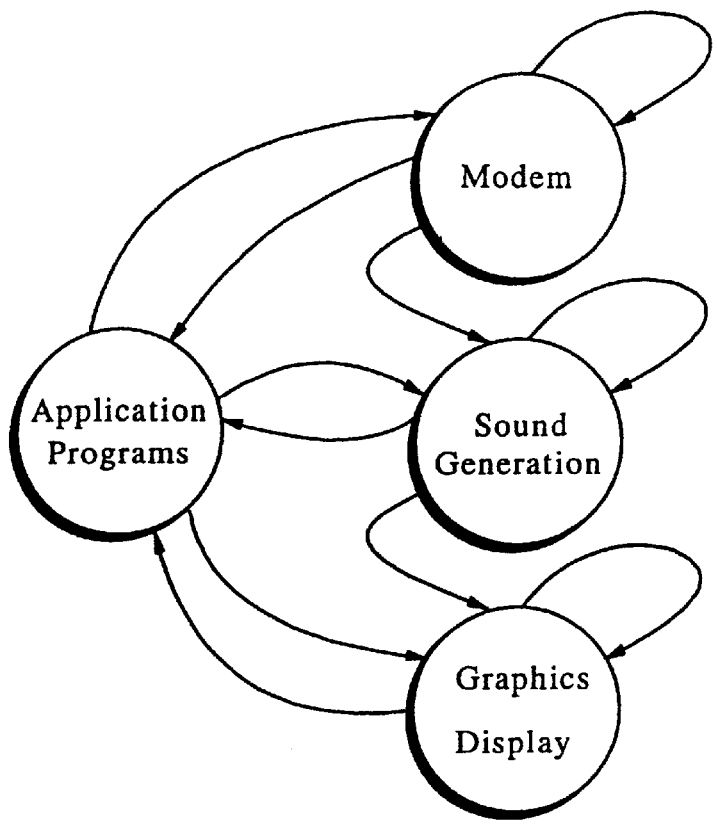
FIG. 3 is a state diagram depicting exemplary reentrancy in the virtual subsystem architecture of the present invention; and, FIG. 4 is a block diagram of exemplary remappable hardware resources, practiced in accordance with the principles of the present invention.

Reference is made to FIG. 2 along with FIG. 3 which depicts a state diagram of an exemplary, although not exclusive, reentrancy in the virtual subsystem architecture of the present invention. According to principles of reentrancy and isochronous "real-time run" virtualization in the present invention, the program which is virtualizing a modem can reenter itself, interrupt the programs virtualizing sound generation or graphics display, or resume the application programs. Similarly, the program which is virtualizing sound generation can reenter itself, interrupt the program virtualizing the graphics display, or resume the application programs. Lastly, the program which is virtualizing a graphics display can reenter itself or resume the application programs. It should be understood that the exemplary reentrancy just described is but one of many examples for which the invention may be practiced. Those skilled in the art will recognize other number of subsystems and hierarchies without departing from the scope or spirit of the present invention.

5. Remappable Hardware Resources

Figure 4:
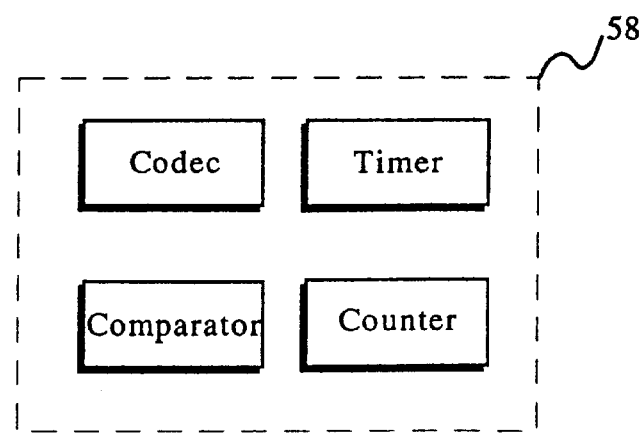

In another aspect of the present invention, the virtual subsystem programs 56 may be assisted with remappable virtual hardware resources 58. Referring specifically to FIG. 4, remappable hardware resources 58 such as, but not limited to, a CODEC, a timer, a comparator, and a counter, are preferably shared on a TDMA basis among the virtual subsystem programs. That is, instead of duplicating hardware resources for each individual virtual subsystem, a resource may be mapped (through control registers or software program initiated control) to assist the virtual subsystem currently being executed.

6. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the Claims.

What is claimed is:

1. A processing system that eliminates selective external bus transactions comprising;
   (a) a processor having a plurality of pipeline stages running an operating system and at least one program by executing a series of program instructions;
   (b) trap circuitry, including internal circuitry coupled to at least one of the plurality of pipeline stages, to detect at least one predetermined event, where the at least one of the plurality of pipeline stages coupled to the trap circuitry is an address calculation stage; and
   (c) a reentrant system management mode mechanism independent of the operating system and responsive to the trap circuitry, to identify the at least one predetermined event and to feed instructions to the processor for execution to perform an equivalent function ordinarily performed by selective external bus transactions in response to the at least one predetermined event.

2. A processing system as recited in claim 1 wherein the trap circuitry further comprises circuitry external to the processor.

3. A processing system as recited in claim 1 wherein the trap circuitry detects memory addresses in the address calculation stage.

4. A processing system as recited in claim 1 wherein the trap circuitry detects I/O addresses in the address calculation stage.

5. A processing system as recited in claim 1 further comprising reconfigurable virtual hardware resources.

6. A computer system that eliminates selective external bus transactions comprising;
   (a) a motherboard;
   (b) a central processing unit having a plurality of pipeline stages running an operating system and at least one program, disposed on the motherboard, and including trap circuitry, having internal circuitry coupled to at least one of the plurality of pipeline stages to detect at least one predetermined event, where the at least one of the plurality of pipeline stages coupled to the trap circuitry is an address calculation stage;
   (c) a memory disposed on the motherboard and coupled to the central processing unit; and
   (d) a reentrant system management mode mechanism, independent of the operating system and responsive to the trap circuitry, for identifying the at least one predetermined event and for routing executable instructions to the central processing unit to perform a function ordinarily performed by selective external bus transactions in response thereto.

7. A computer system as recited in claim 6 wherein the trap circuitry further comprises external circuitry, disposed on the motherboard, to signal the at least one predetermined event to the system management mode mechanism.

8. A computer system as recited in claim 6 wherein the trap circuitry detects memory addresses in the address calculation stage.

9. A computer system as recited in claim 6 wherein the trap circuitry detects I/O addresses in the address calculation stage.

10. A computer system as recited in claim 6 wherein the central processing unit further comprises reconfigurable virtual hardware resources.

11. A method within a microprocessor having a plurality of pipeline stages of eliminating selective external bus transactions, comprising the steps of:

(a) receiving an operating system independent interrupt generated by a source coupled internal to one of the plurality of pipeline stages of the microprocessor;

(b) querying the source in step (a) for an identity of a virtual subsystem;

(c) executing a program to perform an equivalent function of selective external bus transactions by performing a series of steps in a system management interrupt handler, ordinarily performed in response to the source identified in step (b); and (d) reentering the program.

12. A method as recited in claim 11 wherein the source of the operating system independent interrupt further includes assertion of an external pin.

13. A method as recited in claim 11 wherein the source is a predetermined memory address.

14. A method as recited in claim 11 wherein the source is a predetermined I/O address.

* * * * *